United States Patent
Negm

(10) Patent No.: US 10,749,744 B2
(45) Date of Patent: Aug. 18, 2020

(54) ENHANCED PERFORMANCE OF A TELECOMMUNICATIONS NETWORK COMPRISING AT LEAST ONE GROUP OF POOLED MOBILITY MANAGEMENT ENTITIES

(71) Applicant: Deutsche Telekom AG, Bonn (DE)

(72) Inventor: Mohamed Negm, Bonn (DE)

(73) Assignee: DEUTSCHE TELEKOM AG, Bonn (DE)

( * ) Notice: Subject to any disclaimer, the term of this patent is extended or adjusted under 35 U.S.C. 154(b) by 26 days.

(21) Appl. No.: 15/761,818

(22) PCT Filed: Aug. 24, 2016

(86) PCT No.: PCT/EP2016/070024
§ 371 (c)(1),
(2) Date: Mar. 21, 2018

(87) PCT Pub. No.: WO2017/067693
PCT Pub. Date: Apr. 27, 2017

(65) Prior Publication Data
US 2018/0270108 A1  Sep. 20, 2018

(30) Foreign Application Priority Data

Oct. 22, 2015 (EP) ................... 15191104

(51) Int. Cl.
*H04L 12/24* (2006.01)
*H04W 4/50* (2018.01)

(52) U.S. Cl.
CPC .......... *H04L 41/082* (2013.01); *H04L 41/042* (2013.01); *H04L 41/0806* (2013.01);
(Continued)

(58) Field of Classification Search
CPC .................................................. H04L 41/082
(Continued)

(56) References Cited

U.S. PATENT DOCUMENTS 5,023,873 A * 6/1991 Stevenson ........... H04L 41/0654
714/4.4
6,327,591 B1 * 12/2001 Osborn ................. G06F 16/258
(Continued)

FOREIGN PATENT DOCUMENTS

WO  WO 2008082352 A1  7/2008

OTHER PUBLICATIONS

Michaelsen et al., "Re-Establishment Procedure in Dual Connectivity Networks", US Pub 20170099621, 2014 (Year: 2014).*
(Continued)

*Primary Examiner* — Ondrej C Vostal
(74) *Attorney, Agent, or Firm* — Leydig, Voit & Mayer, Ltd.

(57) ABSTRACT

A method for enhanced performance of a telecommunications network includes a first step and/or a second step. The first step includes: the first mobility management entity receives update configuration data; the first configuration data of the first mobility management entity are at least in part replaced or modified by the update configuration data; either the update configuration data or at least part of the updated first configuration data are transmitted to the second mobility management entity; and the second configuration data of the second mobility management entity are at least in part replaced or modified by the update configuration data or by the at least part of the updated first configuration data. The second step includes: upon the second mobility management entity being either restarted and/or updated and/or added to the group of pooled mobility management entities the second mobility management entity receiving startup
(Continued)

configuration data from the first mobility management entity, the startup configuration data being part of the first configuration data or being part of the updated first configuration data of the first mobility management entity.

11 Claims, 2 Drawing Sheets

(52) U.S. Cl.
CPC ...... *H04L 41/0813* (2013.01); *H04L 41/0846* (2013.01); *H04L 41/0893* (2013.01); *H04W 4/50* (2018.02)

(58) Field of Classification Search
USPC .................................................. 709/221, 223
See application file for complete search history.

(56) References Cited

U.S. PATENT DOCUMENTS

| | | | | |
|---|---|---|---|---|
| 9,344,938 | B1* | 5/2016 | Singh | H04W 8/205 |
| 2002/0167896 | A1* | 11/2002 | Puntambekar | H04L 41/0869 370/216 |
| 2006/0090095 | A1* | 4/2006 | Massa | G06F 11/1479 714/4.11 |
| 2008/0125077 | A1* | 5/2008 | Velazquez | H04L 12/66 455/404.2 |
| 2009/0247150 | A1* | 10/2009 | Fischer | H04W 24/10 455/425 |
| 2010/0124933 | A1* | 5/2010 | Chowdhury | H04L 41/0896 455/453 |
| 2010/0220585 | A1* | 9/2010 | Poulson | H04L 45/22 370/216 |
| 2010/0265827 | A1* | 10/2010 | Horn | H04W 72/10 370/241 |
| 2010/0299419 | A1* | 11/2010 | Ramankutty | H04W 24/02 709/221 |
| 2011/0122779 | A1* | 5/2011 | Meirosu | H04W 28/08 370/252 |
| 2011/0122845 | A1* | 5/2011 | Meirosu | H04W 36/0055 370/332 |
| 2011/0235505 | A1* | 9/2011 | Eswara | H04L 43/10 370/221 |
| 2011/0320608 | A1* | 12/2011 | Nelakonda | H04L 12/00 709/226 |
| 2012/0023360 | A1* | 1/2012 | Chang | G06F 11/0709 714/4.11 |
| 2012/0142361 | A1* | 6/2012 | Zhao | H04W 36/28 455/446 |
| 2012/0147733 | A1* | 6/2012 | Wang | H04L 41/082 370/216 |
| 2012/0163203 | A1* | 6/2012 | Wilkinson | H04L 41/5025 370/252 |
| 2013/0059577 | A1* | 3/2013 | Zhao | H04L 41/082 455/423 |
| 2013/0090124 | A1* | 4/2013 | Panchal | H04L 5/0096 455/452.1 |
| 2014/0330976 | A1* | 11/2014 | van Bemmel | H04L 67/1023 709/226 |
| 2014/0357258 | A1* | 12/2014 | Smith | H04L 41/0896 455/423 |
| 2015/0169411 | A1* | 6/2015 | Kalman | G06F 11/2023 714/4.12 |
| 2015/0223284 | A1* | 8/2015 | Jain | H04W 24/02 370/329 |
| 2015/0289167 | A1* | 10/2015 | Alex | H04W 28/24 370/329 |
| 2015/0304798 | A1* | 10/2015 | Yang | H04W 76/30 370/331 |
| 2015/0327324 | A1* | 11/2015 | Wei | H04W 52/0235 370/280 |
| 2015/0381597 | A1* | 12/2015 | Johnson | H04L 63/20 726/12 |
| 2016/0043927 | A1* | 2/2016 | Larson | H04L 45/02 370/389 |
| 2016/0337169 | A1* | 11/2016 | Chhabra | H04L 41/0672 |
| 2016/0337184 | A1* | 11/2016 | Linden | H04W 4/06 |
| 2017/0041824 | A1* | 2/2017 | Costa-Requena | H04L 41/12 |
| 2017/0099621 | A1* | 4/2017 | Michaelsen | H04W 36/0033 |
| 2018/0014276 | A1* | 1/2018 | Ramle | H04W 68/12 |

OTHER PUBLICATIONS

Barton, "LTE and Beyond", "Interfaces and their protocol stacks", 2012 (Year: 2012).*
Microsoft Computer Dictionary, "entity", 2002, pp. 194-195, (Year: 2002).*
Technopedia, "entity", 2020 (Year: 2020).*
"3rd Generation Partnership Project; Technical Specification Group Services and System Aspects; General Packet Radio Service (GPRS) enhancements for Evolved Universal Terrestrial Radio Access Network (E-UTRAN) access (Release 12)", 3GPP Standard; 3GPP TS 23.401, 3rd Generation Partnership Project (3GPP). vol. SA WG2, No. V12.10.0, Sep. 15, 2015 (Sep. 15, 2015), pp. 1-310, XP050996003.

* cited by examiner

ENHANCED PERFORMANCE OF A TELECOMMUNICATIONS NETWORK COMPRISING AT LEAST ONE GROUP OF POOLED MOBILITY MANAGEMENT ENTITIES

CROSS-REFERENCE TO RELATED APPLICATIONS

This application is a U.S. National Phase application under 35 U.S.C. § 371 of International Application No. PCT/EP2016/070024, filed on Aug. 24, 2016, and claims benefit to European Patent Application No. EP 15191104.7, filed on Oct. 22, 2015. The International Application was published in English on Apr. 27, 2017 as WO 2017/067693 A1 under PCT Article 21(2).

FIELD

The present invention relates to a method for enhanced performance of a telecommunications network, wherein the telecommunications network comprises at least one group of pooled mobility management entities, wherein the at least one group of pooled mobility management entities comprises at least a first mobility management entity and a second mobility management entity, wherein the first mobility management entity comprises first configuration data and the second mobility management entity comprises second configuration data.

Furthermore, the present invention relates to a telecommunications network for enhanced performance of a telecommunications network, wherein the telecommunications network comprises at least one group of pooled mobility management entities, wherein the at least one group of pooled mobility management entities comprises at least a first mobility management entity and a second mobility management entity, wherein the first mobility management entity comprises first configuration data and the second mobility management entity comprises second configuration data.

Furthermore, the present invention relates to a pool of mobility management entities for enhanced performance of a telecommunications network, wherein the at least one group of pooled mobility management entities comprises at least a first mobility management entity and a second mobility management entity, wherein the first mobility management entity comprises first configuration data and the second mobility management entity comprises second configuration data.

Furthermore, the present invention relates to a program and to a computer program product for enhanced performance of a telecommunications network according to exemplary embodiments of the inventive method, telecommunications network and pool of mobility management entities.

BACKGROUND

In current telecommunications networks, especially comprising a core network having the functionality of an enhanced packet core, mobility management entities are typically gathered in one or several pools or group of pooled mobility management entities, in order to provide a higher degree of reliability, a comparatively high availability, as well as efficient resource utilization.

Within one group of pooled mobility management entities, each mobility management entity (or unit) should always have the same parameters, e.g. in terms of timers, bearer quality-of-service, load-protection mechanisms, and the like, in order to ensure the best user experience for mobile users of the telecommunications network.

Typically, each unit of a mobility management entity is responsible for the mobility management typically of a plurality of user equipments, wherein for each user equipment, the mobility management includes, inter alia, the attachment of the user equipment (UE Attach), the tracking area update (UE Tracking Area Update, TAU), the detachment of the user equipment (UE Detach). Additionally, many more procedures are handled by the mobility management entities for the respective user equipments being related thereto.

As the telecommunications networks are growing bigger and bigger, with increasing complexity, the groups of pooled mobility management entities are getting bigger or the number of pools increases. The operators of such telecommunications networks typically strive to always ensure similar configurations for a certain number of different mobility management parameters of the evolved packet core network, and this typically over the whole pool of (or group of pooled) mobility management entities—in order to ensure consistency within the group of mobility management entities and in order to be able to deliver the best user experience to the user of the telecommunications network.

However, with an increasing number of mobility management entities and/or with an increasing number of pools of (or groups of) mobility management entities, efforts to keep track of all changes that have to be applied to the different components of the system increases. This is especially true after software changes have to be applied which may affect the configurations already added to the components of the system before the new software takes place. Typically in such a situation, the conventional method relies on configuring the mobility management entities one by one, even though the data to be transferred to the different mobility management entities (of at least one pool of mobility management entities) corresponds to the same data in each case, as, typically, the operator of the telecommunications network needs to ensure the consistency of the configurations within the at least one pool of mobility management entities.

SUMMARY

In an exemplary embodiment, the present invention provides a method for enhanced performance of a telecommunications network. The telecommunications network comprises a group of pooled mobility management entities. The group of pooled mobility management entities comprises a first mobility management entity and a second mobility management entity. The first mobility management entity comprises first configuration data and the second mobility management entity comprises second configuration data. The method comprises at least one of the following steps: a first step comprising a first sub-step, a second sub-step, a third sub-step and a fourth sub-step, wherein: in the first sub-step, the first mobility management entity receives update configuration data; wherein in the second sub-step, subsequent to the first sub-step, the first configuration data of the first mobility management entity prior to receiving the update configuration data are at least in part replaced or modified by the update configuration data, the first configuration data thereby becoming updated first configuration data; wherein in the third sub-step, either the update configuration data or at least part of the updated first configuration data are transmitted to the second mobility management entity; and wherein in the fourth sub-step, subsequent to the third sub-step, the second configuration data of the second mobility management entity—prior to receiving the update configuration data or at least part of the updated first configuration data—are at least in part replaced or modified by the update configuration data or by the at least part of the updated first configuration data, the second configuration data thereby becoming updated second configuration data; a second step comprising—upon the second mobility management entity being either restarted and/or updated and/or added to the group of pooled mobility management entities—the second mobility management entity receiving startup configuration data from the first mobility management entity, the startup configuration data being part of the first configuration data or being part of the updated first configuration data of the first mobility management entity.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
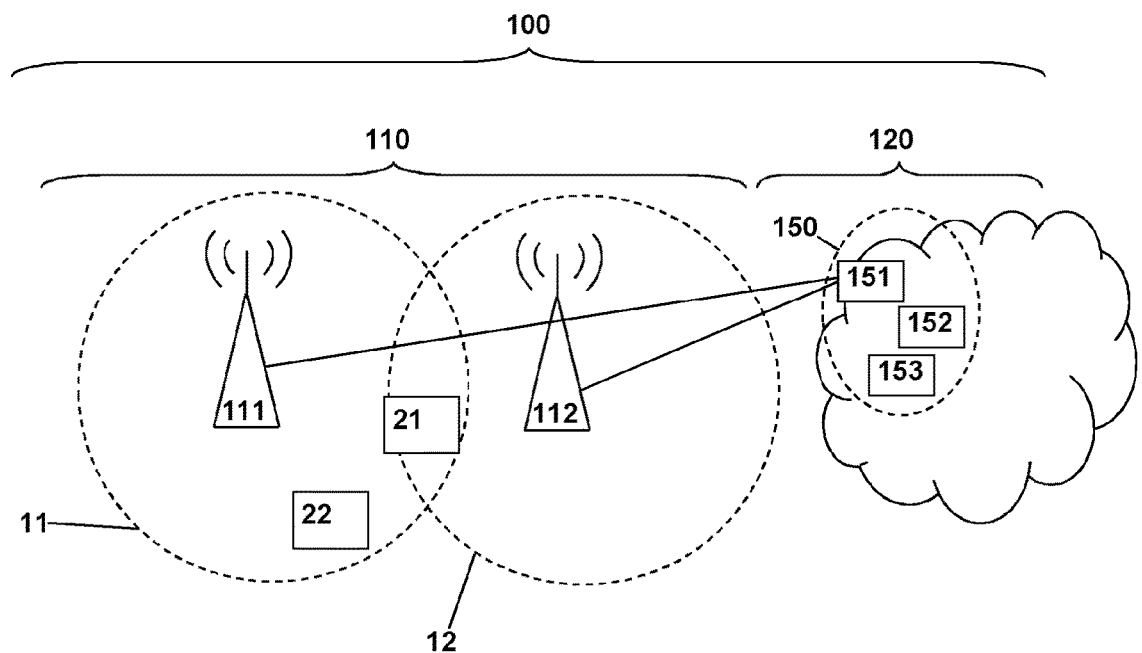
FIG. 1 schematically illustrates a mobile telecommunications network for enhanced performance in the telecommunications network, wherein the mobile communication network serves as an example of a telecommunications network according to the present invention.

Exemplary embodiments of the present invention to provide a method for enhanced performance of a telecommunications network comprising at least one group of pooled mobility management entities (or a pool of mobility management entities) that in turn comprises at least a first and a second mobility management entity such that maintenance efforts regarding the entities of the telecommunications network can be reduced on a per mobility management entity basis, especially the efforts to maintain consistency regarding configuration data of the different mobility management entities, especially within a common pool or group of mobility management entities.

In an exemplary embodiment, the present invention provides a method for enhanced performance of a telecommunications network, wherein the telecommunications network comprises at least one group of pooled mobility management entities, wherein the at least one group of pooled mobility management entities comprises at least a first mobility management entity and a second mobility management entity, wherein the first mobility management entity comprises first configuration data and the second mobility management entity comprises second configuration data, wherein the method comprises at least one of the following steps:

a first step comprises a first sub-step, a second sub-step, a third sub-step and a fourth sub-step, wherein in the first sub-step, the first mobility management entity receives update configuration data, wherein in the second sub-step, subsequent to the first sub-step, the first configuration data of the first mobility management entity—prior to receiving the update configuration data—are at least in part replaced or modified by the update configuration data, the first configuration data thereby becoming updated first configuration data, wherein in the third sub-step, either the update configuration data, or at least part of the updated first configuration data are transmitted to the second mobility management entity, and wherein in the fourth sub-step, subsequent to the third sub-step, the second configuration data of the second mobility management entity—prior to receiving the update configuration data or at least part of the updated first configuration data—are at least in part replaced or modified by the update configuration data or by the at least part of the updated first configuration data, the second configuration data thereby becoming updated second configuration data, a second step comprises—upon the second mobility management entity being either restarted and/or updated and/or added to the group of pooled mobility management entities the second mobility management entity receiving startup configuration data from the first mobility management entity, the startup configuration data being part of the first configuration data or being part of the updated first configuration data of the first mobility management entity.

It is thereby advantageously possible according to the present invention that update configuration data and/or startup configuration data is exchanged between the first mobility management entity and the second mobility management entity, i.e. it is no longer necessary to provide the update configuration data (in case of the necessity to update a certain number of mobility management entities within a group of pooled mobility management entities) to each and every mobility management entity and/or to provide the startup configuration data to the newly introduced or rebooted/restarted mobility management entities (e.g. in case of failures of mobility management entities and/or in case of the deployment of further (new) mobility management entities), especially it is not necessary according to the present invention that a hierarchically higher network node within the telecommunications network provides the update configuration data to each one of the mobility management entities within the respective pool or group of mobility management entities or that such a (different or same) hierarchically higher network node transmits startup configuration data to the newly introduced or (re)started mobility management entities. Instead, according to the present invention, it is sufficient that—regarding a considered group of pooled mobility management entities or regarding a pool of mobility management entities—a hierarchically higher network node of the telecommunications network provides update configuration data to one of the mobility management entities of the considered pool or group and the relevant content (at least the new or modified content) of the configuration data is propagated to the other mobility management entities of the considered pool or group of mobility management entities. Of course, according to the present invention, it is also possible that the telecommunications network comprises a plurality of different groups of pooled mobility management entities (or pools of mobility management entities), wherein—in case of the necessity to update the configuration data of the mobility management entities—each group of pooled mobility management entities (or each pool of mobility management entities), i.e. one of the mobility management entities of the considered pool or group, receives (typically once) the update configuration data (from the same of network node or from different network nodes), and the content (or the new or modifying content) of these update configuration data are propagated among the mobility management entities within the considered pool or group, respectively, i.e. a first mobility management entity transmits (after having received the update configuration data from the hierarchically higher network node) the update configuration data to a second mobility management entity (and, in the following, also to the other mobility management entities of the group of pool). In case of restarts or updates of mobility management entities or in case of additional mobility management entities being added to the pool or group, the restarted or updated or added mobility management entities receive startup configuration data from a member of the group or pool of mobility management entities, i.e. from the first mobility management entity. It is preferred according to the present invention that the group or pool of mobility management entities comprises a default (or administration) mobility management entity that has the task of propagating any update configuration data to all the other mobility management entities of the pool or group of mobility management entities. If the default mobility management entity is the one that receives the update configuration data (from the hierarchically higher network node), then the corresponding new configuration content is propagated to the other mobility management entities, i.e. especially from the first mobility management entity (e.g. acting as default mobility management entity) to the second mobility management entity. If a non-default mobility management entity (i.e. mobility management entity that is not the default mobility management entity) is the one that receives the update configuration data (from the hierarchically higher network node), then the corresponding new configuration content is first transmitted to the default mobility management entity (especially from the first mobility management entity to the second mobility management entity, then acting as default mobility management entity), and then propagated (by the default mobility management entity) to the other mobility management entities.

According to the present invention, it is advantageously possible to provide a solution that simplifies the task of administrating the mobility management entities of a pool or of a group, wherein communication exchange between the mobility management entities in the pool or in the group is used to ensure that the same application parameters (or configuration data) are consistently distributed or propagated among the mobility management entities in the group or pool, thereby decreasing the amount of user interaction (or interaction of a human operator) necessary to maintain a consistent configuration of the mobility management entities, which leads to decreasing the operational costs related to the telecommunications network.

According to the present invention it is preferred that the first configuration data comprises first basic configuration data and first automatic configuration data, wherein the second configuration data comprises second basic configuration data and second automatic configuration data, wherein the first and second basic configuration data comprise configuration data up to the network layer, and wherein the first and second automatic configuration data comprise at least one out of the following:
  bearer quality-of-service information,
  quality-of-service settings,
  host file configuration data,
  configuration data related to mobility management counters.

Thereby, it is advantageously possible that a part of the configuration data are manually distributed—typically such basic configuration data that might be less prone to frequent changes, especially as these are more hardware-related instead of software-related. The basic configuration data (i.e. the first basic configuration data related to the first mobility management entity and the second basic configuration data related to the second mobility management entity) preferably includes all configuration data up to the network layer (physical hardware, physical boards, network information). According to a preferred embodiment of the present invention, these basic configuration data are distributed or operated in a conventional manner, i.e. each and every mobility management entity receives its basic configuration data individually from a hierarchically higher network node of the telecommunications network, which means that regarding the basic configuration data no changes are preferably applied compared to the conventional manner of distributing the configuration data. Regarding the automatic configuration data, this part includes the application configurations which will be exchanged automatically between the mobility management entities in the pool or group of mobility management entities. This typically includes: Bearers QoS, Host file information, and Mobility management counters configurations. The automatic configuration data are exchanged as proposed according to the present invention in order to optimize the operation resources, i.e. the mobility management entities in one pool (or group) of mobility management entities should always communicate together to exchange and automatically apply the latest configurations based on the latest configuration made by the operator of the telecommunications network.

According to the present invention it is preferred that the at least one group of pooled mobility management entities comprises a default mobility management entity, wherein the first mobility management entity is the default mobility management entity, wherein the first step comprises based on the update configuration data received by the first mobility management entity conducting the third sub-step and the fourth sub-step with respect to each mobility management entity in the group of pooled mobility management entities.

Thereby, it is advantageously possible to realize the distribution or the propagation of the (automatic) configuration data within the group (or pool) of mobility management entities.

According to the present invention it is preferred that the at least one group of pooled mobility management entities comprises a default mobility management entity, wherein the second mobility management entity is the default mobility management entity, wherein after the first step, an analogous step is performed, wherein the analogous step comprises a fifth sup-step and a sixth sub-step, wherein in the fifth sub-step, either the update configuration data, or at least part of the updated second configuration data are transmitted to the further mobility management entities, and wherein in the sixth sub-step, subsequent to the fifth sub-step, the corresponding configuration data of the further mobility management entities are at least in part replaced or modified by the update configuration data or by the at least part of the updated second configuration data.

By reversing the roles of default mobility management entity and non-default mobility management entity among the first and second mobility management entity (i.e. the second mobility management entity is the default mobility management entity, and the first mobility management entity is the non-default (or "normal" mobility management entity)), it is advantageously possible to realize the propagation of the configuration data even in case that the update configuration data are transmitted to a non-default mobility management entity in the first place.

According to a further preferred embodiment of the present invention, in case that the default mobility management entity fails, the function of default mobility management entity is taken over by another mobility management entity of the group or pool of mobility management entities, i.e., in a first point in time, the first mobility management entity is the default mobility management entity of the group of pooled mobility management entities, in a subsequent second point in time, the first mobility management entity fails, and wherein, as a consequence of the failure of the first mobility management entity, the second mobility management entity becomes the default mobility management entity of the group of pooled mobility management entities.

According to the present invention, it is preferred that within one pool or group of mobility management entities, one of the different mobility management entities should be the admin mobility management entity or the default mobility management entity, while other mobility management entities should follow the same data, and also other MMEs can have different priorities in the pool in case the default MME is down or out of service.

The "default MME" priorities settings in each MME in the pool should be a part of the basic data configurations (configured manually), but could also be part of the automatic configuration data, i.e. changed or update according to the present invention.

According to the present invention it is preferred that the mobility management entities of the at least one group of pooled mobility management entities—especially the first mobility management entity and the second mobility management entity—are connected via at least one S10 interface.

Thereby, it is advantageously possible to easily provide an exchange of configuration data between the mobility management entities of the group or pool of mobility management entities. In the context of the present invention, the wording "the mobility management entities of the at least one group of pooled mobility management entities are connected via at least one S10 interface" especially means that each mobility management entity is able to be connected (especially via a S10 interface) with each and every other mobility management entity, at least of the group of pooled mobility management entities it belongs to.

According to the present invention it is preferred that—in case that the connection, especially the S10 interface, between the first mobility management entity and the second mobility management entity is interrupted—the method comprises the further steps of:

restoring the connection between the first mobility management entity and the second mobility management entity, and the second mobility management entity requesting, at the first mobility management entity, to transmit either the update configuration data or at least part of the updated first configuration data to the second mobility management entity, especially in case that the first mobility management entity is the default mobility management entity.

Thereby, it is advantageously possible to provide a coordinated manner of transmitting the updated configuration data.

According to the present invention it is preferred that the at least one group of pooled mobility management entities comprises—besides the default mobility management entity—a further default mobility management entity (or a mobility management entity having a higher priority than the other mobility management entities (besides the default mobility management entity)), wherein, upon failure of the default mobility management entity, the further default mobility management entity becomes—and especially remains afterwards, despite a recovery of the former default mobility management entity—the default mobility management entity.

It is thereby advantageously possible that there is always a default mobility management entity in the group of pooled mobility management entities. It is of particular advantage that if the default mobility management entity goes down (for maintenance reasons, or for upgrade reasons, etc.), the next highest priority mobility management entity will be the default mobility management entity of the group or pool, and the failed (or down) mobility management entity will lose the default mobility management entity rights when it is back to service again; thereby, it can advantageously be assured that there is no ping pong effect with changing priorities in the group of mobility management entities back and forth.

Furthermore, the present invention relates to a telecommunications network for enhanced performance of a telecommunications network, wherein the telecommunications network comprises at least one group of pooled mobility management entities, wherein the at least one group of pooled mobility management entities comprises at least a first mobility management entity and a second mobility management entity, wherein the first mobility management entity comprises first configuration data and the second mobility management entity comprises second configuration data, wherein the telecommunications network is configured such that:

the first mobility management entity receives update configuration data, the first configuration data of the first mobility management entity—prior to receiving the update configuration data—are at least in part replaced or modified by the update configuration data, the first configuration data thereby becoming updated first configuration data, wherein either the update configuration data, or at least part of the updated first configuration data are transmitted to the second mobility management entity, and wherein the second configuration data of the second mobility management entity—prior to receiving the update configuration data or at least part of the updated first configuration data— are at least in part replaced or modified by the update configuration data or by the at least part of the updated first configuration data, the second configuration data thereby becoming updated second configuration data, and/or upon the second mobility management entity being either restarted and/or updated and/or added to the group of pooled mobility management entities, the second mobility management entity receiving startup configuration data from the first mobility management entity, the startup configuration data being part of the first configuration data or being part of the updated first configuration data of the first mobility management entity.

Thereby, it is advantageously possible according to the present invention to provide a telecommunications network having a reduced maintenance requirements for a given number of mobility management entities or pools (or groups) of mobility management entities.

Furthermore, the present invention relates to pool of mobility management entities (or to a group of pooled mobility management entities) for enhanced performance of a telecommunications network, wherein the at least one group of pooled mobility management entities comprises at least a first mobility management entity and a second mobility management entity, wherein the first mobility management entity comprises first configuration data and the second mobility management entity comprises second configuration data, wherein the pool of mobility management entities is configured such that:

the first mobility management entity receives update configuration data, the first configuration data of the first mobility management entity—prior to receiving the update configuration data—are at least in part replaced or modified by the update configuration data, the first configuration data thereby becoming updated first configuration data, wherein either the update configuration data, or at least part of the updated first configuration data are transmitted to the second mobility management entity, and wherein the second configuration data of the second mobility management entity—prior to receiving the update configuration data or at least part of the updated first configuration data— are at least in part replaced or modified by the update configuration data or by the at least part of the updated first configuration data, the second configuration data thereby becoming updated second configuration data, and/or upon the second mobility management entity being either restarted and/or updated and/or added to the group of pooled mobility management entities, the second mobility management entity receiving startup configuration data from the first mobility management entity, the startup configuration data being part of the first configuration data or being part of the updated first configuration data of the first mobility management entity.

Thereby, it is advantageously possible according to the present invention to provide a pool of mobility management entities (or a group of pooled mobility management entities) that is easier to operate.

Additionally, the present invention relates to a program comprising a computer readable program code which, when executed on a computer or on a mobility management entity of pool of mobility management entities of a telecommunications network, or in part on a first mobility management entity and in part on a second mobility management entity of the telecommunications network, causes the computer or the mobility management entity of the pool of mobility management entities or the first and/or second mobility management entity of the telecommunications network to perform the method according to the present invention.

Still additionally, the present invention relates to a computer program product for enhanced performance of a telecommunications network, the computer program product comprising a computer program stored on a storage medium, the computer program comprising program code which, when executed on a computer or on a mobility management entity of pool of mobility management entities of a telecommunications network, or in part on a first mobility management entity and in part on a second mobility management entity of the telecommunications network, causes the computer or the mobility management entity of the pool of mobility management entities or the first and/or second mobility management entity of the telecommunications network to perform the method according to the present invention.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a telecommunications network 100 for enhanced performance is schematically illustrated. The telecommunications network 100 is implemented as a mobile telecommunication network comprising a radio access network 110 and a core network 120. The access network 110 of the telecommunications network 100 comprises a plurality of radio cells of which a first radio cell 11 and a second radio cell 12 is exemplarily represented. The radio cells 11, 12 correspond to radio coverage areas of base station entities, typically NodeBs or eNodeBs, of which a first base station entity 111 and a second base station entity 112 are schematically represented in FIG. 1. The telecommunications network 100 is configured to provide communication services to a plurality of user equipments 21, 22.

The core network 120 of the telecommunications network 100 comprises a plurality of network nodes or entities that are not represented in detail. However, a group of pooled mobility management entities 150 is schematically shown being part of the core network 120. The group of pooled mobility management entities 150 (or the pool of mobility management entities 150) comprises a first mobility management entity 151, a second mobility management entity 152, and a third mobility management entity 153 as examples of the mobility management entities of the pool or the group 150 of mobility management entities. Typically, such groups or pools of mobility management entities can comprise many more mobility management entities than just three mobility management entities, e.g. many tens of mobility management entities.

Figure 2:
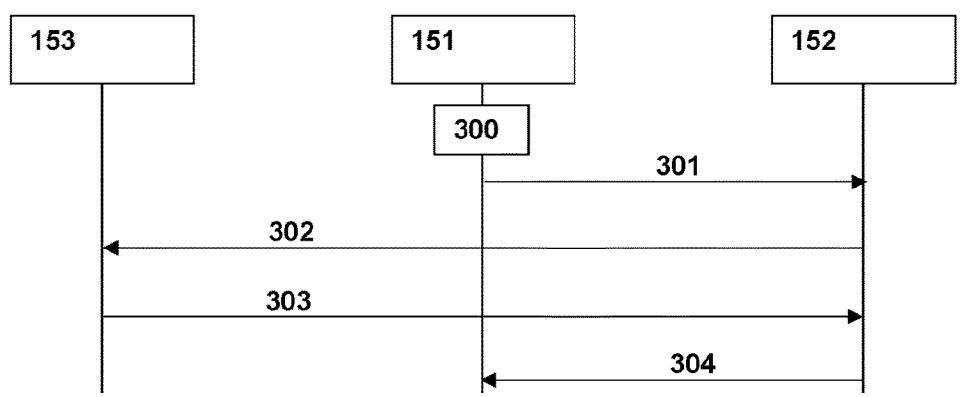
FIG. 2 schematically illustrates the exchange of information between a first mobility management entity, a second mobility management entity, and a third mobility management entity in case that the first mobility management entity receives update configuration data from a hierarchically higher network node of the telecommunications network.

In FIG. 2, the exchange of information between a first mobility management entity 151, a second mobility management entity 152, and a third mobility management entity 153 is schematically shown in case that the first mobility management entity 151 receives update configuration data from a hierarchically higher network node of the telecommunications network 100. The configuration exchange process (of the operator of the group or pool of mobility management entities changing configurations on one of the mobility management entities) is hereinafter explained in detail. In processing step 300, the manual update, i.e. the reception of update configuration data occurs, i.e. the operator of the pool of mobility management entities changes at least one parameter in the automatic data section on one of the mobility management entities in the pool (or group). In the example shown, it is the first mobility management entity 151 that is updated in processing step 300, the second mobility management entity 152 being the default mobility management entity in that example. The first mobility management entity 151 applies the change of configuration, i.e. the update configuration data received by the first mobility management entity 151 are integrated in the first configuration data of the first mobility management entity 151. The updated mobility management entity (i.e. the first mobility management entity 151 in the example shown) notifies—in a processing step 301—the default mobility management entity (i.e. the second mobility management entity 152 in the example shown) about that change. The default mobility management entity (i.e. in the example shown the second mobility management entity 152) will then compare the change with its own configurations and apply it (i.e. integrate the change in its own second configuration data), then it will send a change request to all other mobility management entities in the pool to also apply the same change; this is performed in processing steps 302 and 303 for the example of the third mobility management entity 153. Of course, typically these processing steps 302 and 303 also occur for all other mobility management entities of the pool or group besides the three mobility management entities already mentioned. After successful change on all mobility management entities of the pool or group, the mobility management entities should reply to the default mobility management entity with a positive response to acknowledge the change has been done; for the third mobility management entity 153, this corresponds to processing step 303. The default mobility management entity should at the end acknowledge—processing step 304—the change to the mobility management entity which requested it. According to a preferred embodiment, the mobility management entity that started the procedure (in the example shown in FIG. 2, this corresponds to the first mobility management entity 151) should start a timer (change request timer) after the notification (processing step 301) is sent to the default mobility management entity. If the timer expired and the default mobility management entity did not acknowledge the notification, the mobility management entity concerned (i.e. the first mobility management 151 entity in the example shown) should resent the notification message (i.e. a repetition of processing step 301), and restart the timer. According to a further preferred embodiment of the present invention, after resending the notification for three times with no acknowledgement from the default mobility management entity, the mobility management entity concerned shall consider the changes as not applied and should revert back to the previous configurations, and provide an error code to the operator.

According to another example, not shown in FIG. 2, the first mobility management entity 151 is both the default mobility management entity (of the group or pool of mobility management entities) and the one that receives the manual update, i.e. the update configuration data. In such a situation, processing steps analogous to processing steps 302 and 303 will occur for any other non-default mobility management entity in the group or pool of mobility management entities.

Figure 3:
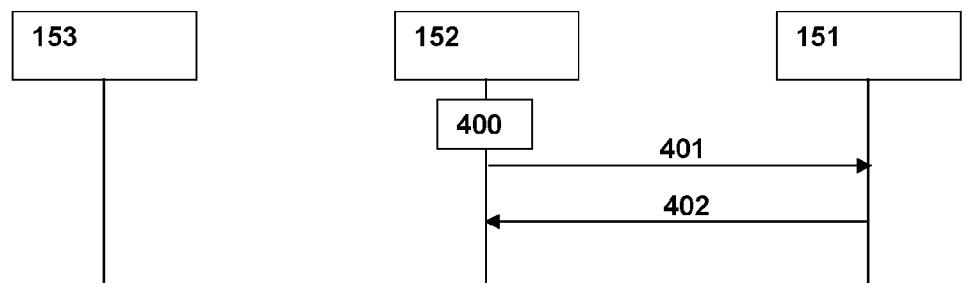
FIG. 3 schematically illustrates the exchange of information between a first mobility management entity and a second mobility management entity in case that the second mobility management entity is added to the pool or group of mobility management entities.

FIG. 3 schematically illustrates the exchange of information between the first mobility management entity 151, and the second mobility management entity 152 in case that the second mobility management entity 152 is added to the pool or group of mobility management entities 150. Processing step 400 corresponds to a new mobility management entity entering the pool or group of mobility management entities. When a new mobility management entity is added to the pool (or the mobility management entity concerned was out of the pool for an upgrade and/or maintenance procedure and is then brought back to the pool), such a mobility management entity should have the default mobility management entity information (or configuration data) of this pool configured in the basic data section. The new mobility management entity (in the example shown, this is the second mobility management entity 152) sends to the default mobility management entity (in the example shown, this is the first mobility management entity 151) a registration request in processing step 401 asking for the latest pool automatic data section configurations, i.e. asking for the startup configuration data to be sent by the default mobility management entity (in the example shown the first mobility management entity 151). The request message (i.e. processing step 401) could also contain the current configured default mem priorities in the new mobility management entity (i.e. the second mobility management entity 152 in the example shown). The default mobility management entity compares the current priorities with the priorities configured in the new mobility management entity, and then replies with a response message—processing step 402—containing the automatic data section configurations to be applied (i.e. the startup configuration data) and also any changes to the priorities in the pool if it is different from the new mobility management entity ones.

Figure 4:
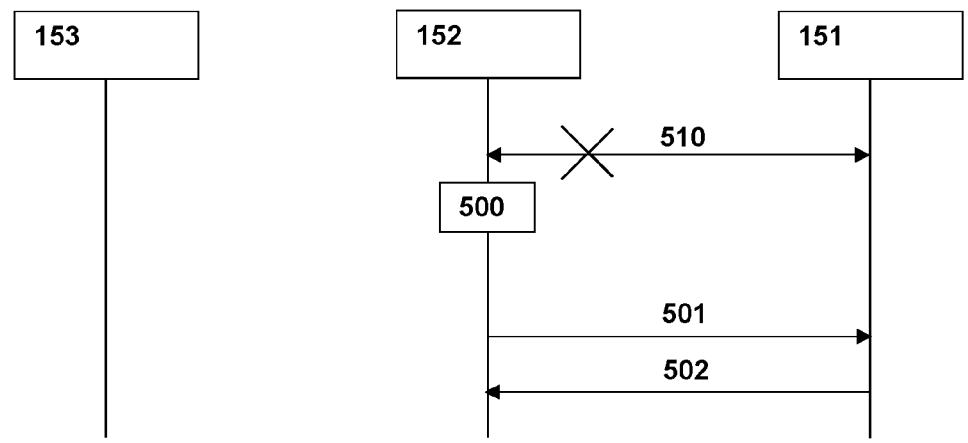
FIG. 4 schematically illustrates the exchange of information between a first mobility management entity and a second mobility management entity in case that the connection between them is interrupted.

In FIG. 4, the exchange of information between the first mobility management entity 151, and the second mobility management entity 152 is schematically shown in case that the connection between them is interrupted. The interruption of the communication link between the first mobility management entity 151 and the second mobility management entity 152—typically an S10 interface link—is schematically represented by processing step 510. When the mobility management entity (in the example shown in FIG. 4, it is the second mobility management entity 152) in a pool suffers from S10 interface disconnection with some or all other mobility management entities in the pool, this mobility management entity starts a timer—in processing step 500—for the disconnection duration. When the connection, especially the S10 interface, recovers with the mobility management entities in the pool (at least with the default mobility management entity, being in the example shown the first mobility management entity 151) and if the mentioned timer has already exceeded a configured value, the mobility management entity concerned (i.e. the second mobility management entity 152 in the example shown in FIG. 4) should consider itself as a new mobility management entity in the pool. Accordingly this mobility management entity should start a registration procedure as described in FIG. 3. Accordingly, processing steps 501 and 502 correspond to processing steps 401 and 402.

According to the present invention, it is preferred that the configuration data to be exchanged comprise the following:

Host file configurations: This file contains the domain name translations for Access Point Names (APNs), Routing Area Codes (RACs), Tracking Area Codes (TACs), ... etc. It is typically of higher priority than the mobile network Domain Name System (DNS), and for some operators of telecommunications networks these help to ensure load balancing to the gateways in case of using different mobility management entity pools for example and it is used to route traffic of each mobility management entity pool to a different gateway;

Mobility management timers/counters: As the mobility management entity controls the user equipment mobility management procedures through a set of counters, to identify the current status of the user equipment (connected, detached, ... etc.), such counters or timers should always be the same at least for all mobility management entities in the same pool; according to preferred embodiments of the present invention, such counters or timers preferably correspond to: Tracking Area Update (TAU) timer (that should be exchanged with the user equipment to define when the user equipment will have the next TAU); Mobile reachable timer (that starts immediately after the TAU timer expires, and waiting for the user equipment to perform the TAU; if expired, the user equipment will be considered as out of coverage and Paging Proceed Factor (PPF) flag will be cleared from the mobility management entity (flag to identify the user tracking area for paging)); Implicit detach timer (that starts after the reachable timer expires, and after it expires, the mobility management entity will delete all bearers for the user and will consider the user as detached);

Quality-of-service settings: In some cases the mobility management entity can have quality-of-service (QoS) parameters configured locally (QCI (QoS Class Identifier), ARP (Allocation Retention Priority), MBR (Maximum Bit Rate), ... etc.), to take over the QoS coming from the HSS (Home Subscriber Server). Especially in these cases, the mobility management entities in one pool should be able to exchange the current quality-of-service parameters configured to ensure the same quality-of-service is applied from all mobility management entities to ensure better user experience.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method, comprising at least one of the following steps:
   a first step comprising:
      receiving, by a first mobility management entity (MME) of a group of pooled MMEs of a telecommunications network, update configuration data,
      wherein the group of pooled MMEs comprises the first MME and a second MME,
      wherein the first MME comprises first configuration data and the second MME comprises second configuration data;
      updating, by the first MME, the first configuration data based on the update configuration data;
      transmitting, by the first MME, the update configuration data or at least part of the updated first configuration data to the second MME; and
      updating, by the second MME, the second configuration data based on the update configuration data or the at least part of the updated first configuration data;
   a second step comprising,
      upon the second MME being restarted and/or updated and/or added to the group of pooled MMEs, receiving, by the second MME, startup configuration data from the first MME,
      wherein the startup configuration data is part of the first configuration data or part of the updated first configuration data of the first MME.

2. The method according to claim 1,
   wherein the first configuration data comprises first basic configuration data and first automatic configuration data,
   wherein the second configuration data comprises second basic configuration data and second automatic configuration data,
   wherein the first and second basic configuration data comprise configuration data up to the network layer, and
   wherein the first and second automatic configuration data comprise at least one out of the following:
   bearer quality-of-service information;
   quality-of-service settings;
   host file configuration data; or
   configuration data related to mobility management counters.

3. The method according to claim 1,
   wherein the first MME is a default MME,
   wherein the update configuration data or at least part of the updated first configuration data is transmitted to each MME in the group of pooled MMEs, and wherein respective configuration data of each MME in the group of pooled MMEs is updated based on the update configuration data or based on the at least part of the updated first configuration data.

4. The method according to claim 1,
wherein the second MME is a default MME,
wherein the update configuration data or at least part of the updated second configuration data is transmitted to further MMEs, and
wherein respective configuration data of the further MMEs are updated based on the update configuration data or based on the at least part of the updated second configuration data.

5. The method according to claim 1,
wherein, in a first point in time, the first MME is a default MME of the group of pooled MMEs,
wherein, in a subsequent second point in time, the first MME fails, and
wherein, as a consequence of the failure of the first MME, the second MME becomes the default MME of the group of pooled MMEs.

6. The method according to claim 1, wherein the first MME and the second MME are connected via at least one S10 interface.

7. The method according to claim 1, wherein in case that an S10 interface between the first MME and the second MME is interrupted the method comprises:
restoring a connection between the first MME and the second MME; and
requesting, by the second MME, that the first MME transmit either the update configuration data or at least part of the updated first configuration data to the second MME in case that the first MME is a default MME.

8. The method according to claim 1,
wherein the group of pooled MMEs comprises a default MME and a further default MME,
wherein, upon failure of the default MME, the further default MME becomes—and remains afterwards, despite a recovery of the former default MME—the default MME.

9. The method according to claim 1,
wherein the first MME is a default MME of the group of pooled MMEs configured to propagate any update configuration data to all other MMEs in the group of pooled MMEs,
wherein:
in case the default MME first receives new update configuration data, the default MME propagates the new configuration data to all other MMEs in the group of pooled MMEs; and
in case a non-default MME first receives new update configuration data, the non-default MME transmits the new configuration data to the default MME which then propagates the new configuration data to all other MMEs in the group of pooled MMEs.

10. A system, comprising:
a group of pooled mobility management entities (MMEs) within one or more devices of a telecommunications network,
wherein the group of pooled MMEs comprises a first MME and a second MME,
wherein the first MME comprises first configuration data and the second MME comprises second configuration data;
wherein:
the first MME, within the one or more devices, is configured to receive update configuration data, and to update the first configuration data based on the update configuration data;
the first MME, within the one or more devices, is further configured to transmit the update configuration data or at least part of the updated first configuration data to the second MME;
the second MME, within the one or more devices, is configured to update the second configuration data based on the update configuration data or the at least part of the updated first configuration data; and/or
wherein the second MME, within the one or more devices, is configured, upon the second MME being restarted and/or updated and/or added to the group of pooled MMEs, to receive startup configuration data from the first MME,
wherein the startup configuration data is part of the first configuration data or is part of the updated first configuration data.

11. One or more non-transitory computer-readable mediums having processor-executable instructions stored thereon,
wherein the processor-executable instructions, when executed, facilitate performance of at least one of the following steps:
a first step comprising:
receiving, by a first mobility management entity (MME) of a group of pooled MMEs of a telecommunications network, update configuration data,
wherein the group of pooled MMEs comprises the first MME and a second MME,
wherein the first MME comprises first configuration data and the second MME comprises second configuration data;
updating, by the first MME, the first configuration data based on the update configuration data;
transmitting, by the first MME, the update configuration data or at least part of the updated first configuration data to the second MME; and
updating, by the second MME, the second configuration data based on the update configuration data or the at least part of the updated first configuration data;
a second step comprising, upon the second MME being restarted and/or updated and/or added to the group of pooled MMEs, receiving, by the second MME, startup configuration data from the first MME,
wherein the startup configuration data is part of the first configuration data or part of the updated first configuration data of the first MME.

* * * * *